US006987513B2

(12) United States Patent
Dewa et al.

(10) Patent No.: US 6,987,513 B2
(45) Date of Patent: Jan. 17, 2006

(54) GRAPHICAL USER INTERFACE UTILIZING A PLURALITY OF NODE PROCESSING MEANS FOR VIEW/DRAWING INCLUDING ANALYSIS, SELECTION, DISPLAY CONTROL, VIEW GENERATION AND RE-GENERATION

(75) Inventors: Yoshiharu Dewa, Tokyo (JP); Mitsuhiro Miyazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 377 days.

(21) Appl. No.: 10/071,493

(22) Filed: Feb. 6, 2002

(65) Prior Publication Data

US 2002/0122047 A1    Sep. 5, 2002

(30) Foreign Application Priority Data

Feb. 9, 2001    (JP)    ............................. P2001-034331

(51) Int. Cl.
    *G06T 11/20*    (2006.01)
(52) U.S. Cl. ....................... 345/440; 345/619; 709/224
(58) Field of Classification Search ................ 376/259; 700/83; 715/808, 5, 500.1; 345/440, 619, 345/707, 713, 762–767, 881–832, 884, 853; 709/224, 206; 707/5; 706/10
    See application file for complete search history.

(56) References Cited

U.S. PATENT DOCUMENTS

| | | | |
|---|---|---|---|
| 4,902,469 A * | 2/1990 | Watson et al. .............. 376/259 |
| 5,032,978 A * | 7/1991 | Watson et al. ................ 700/83 |
| 5,251,152 A * | 10/1993 | Notess ........................ 709/224 |
| 5,297,253 A * | 3/1994 | Meisel ........................ 345/854 |
| 5,539,869 A * | 7/1996 | Spoto et al. ............. 715/500.1 |
| 5,727,129 A * | 3/1998 | Barrett et al. ................ 706/10 |
| 5,835,085 A * | 11/1998 | Eick et al. ................... 715/853 |
| 5,874,572 A * | 2/1999 | Kim et al. ................... 540/460 |
| 6,006,262 A * | 12/1999 | Thomason et al. ......... 709/224 |
| 6,128,016 A * | 10/2000 | Coelho et al. .............. 715/808 |
| 6,154,215 A * | 11/2000 | Hopcroft et al. ............ 345/418 |
| 6,278,446 B1 * | 8/2001 | Liou et al. ................... 345/700 |
| 6,462,762 B1 * | 10/2002 | Ku et al. ..................... 345/853 |
| 6,483,508 B1 * | 11/2002 | Ishikawa ..................... 345/420 |
| 6,486,898 B1 * | 11/2002 | Martino et al. ............. 345/853 |
| 6,683,619 B1 * | 1/2004 | Samra ......................... 345/619 |
| 6,775,659 B2 * | 8/2004 | Clifton-Bligh ................ 707/1 |
| 2002/0065818 A1 * | 5/2002 | Starr .............................. 707/5 |
| 2003/0126221 A1 * | 7/2003 | Tanaka et al. .............. 709/206 |
| 2003/0140135 A1 * | 7/2003 | Okuyama et al. ........... 709/223 |

* cited by examiner

*Primary Examiner*—Matthew C. Bella
*Assistant Examiner*—Anthony J. Blackman
(74) *Attorney, Agent, or Firm*—Jay H. Maioli

(57) ABSTRACT

A display controlling method that can easily generate various interface displays. A user generates a program including: nodes n1 to n9, for example, each serving as a data group indicating a static attribute of a link to referential data or actual referential data and each serving as a constitutive unit of a drawing; and views v1 to v4, for example, each serving as a data group for specifying the node carrying out the drawing in a drawing style on a screen of the node, and in accordance with the program, the view is automatically selected, and an image corresponding to the node specified by the selected view is displayed on a screen in the drawing style specified by the view.

8 Claims, 15 Drawing Sheets

FIG. 6

```
<view-node id="1"view-factor="design"/>
<view-node id="2"view-factor="design"/>
```
(i)

```
<view-navigation id="1"self="1"neighbor="2"/>
```
(ii)

```
view-navigation#1{
        view-effect:zoom
        animation-time:200
}
```
(iii)

```
<node id="1"object-type="image"contents-type"image/jpg"
data=url("http://zim1.a.co.jp/data/genre1.jpg")focus="got_focus"keyword="pops"/>
<node id="2"object-type="image"contents-type"image/gif"
data=url("http://zim1.a.co.jp/data/puffy1.jpg")focus="got_focus"keyword="puffy"/>
```
(iv)

```
<node-connectionid="1"self="1"children="2"/>
```
(v)

```
view-node#1{
    view-style:scroll;
    node-id:1;
}
view-node#2{
    view-style:icon;
    node-id:2;
    node-row:1;
    node-line:1;
}
```
(vi)

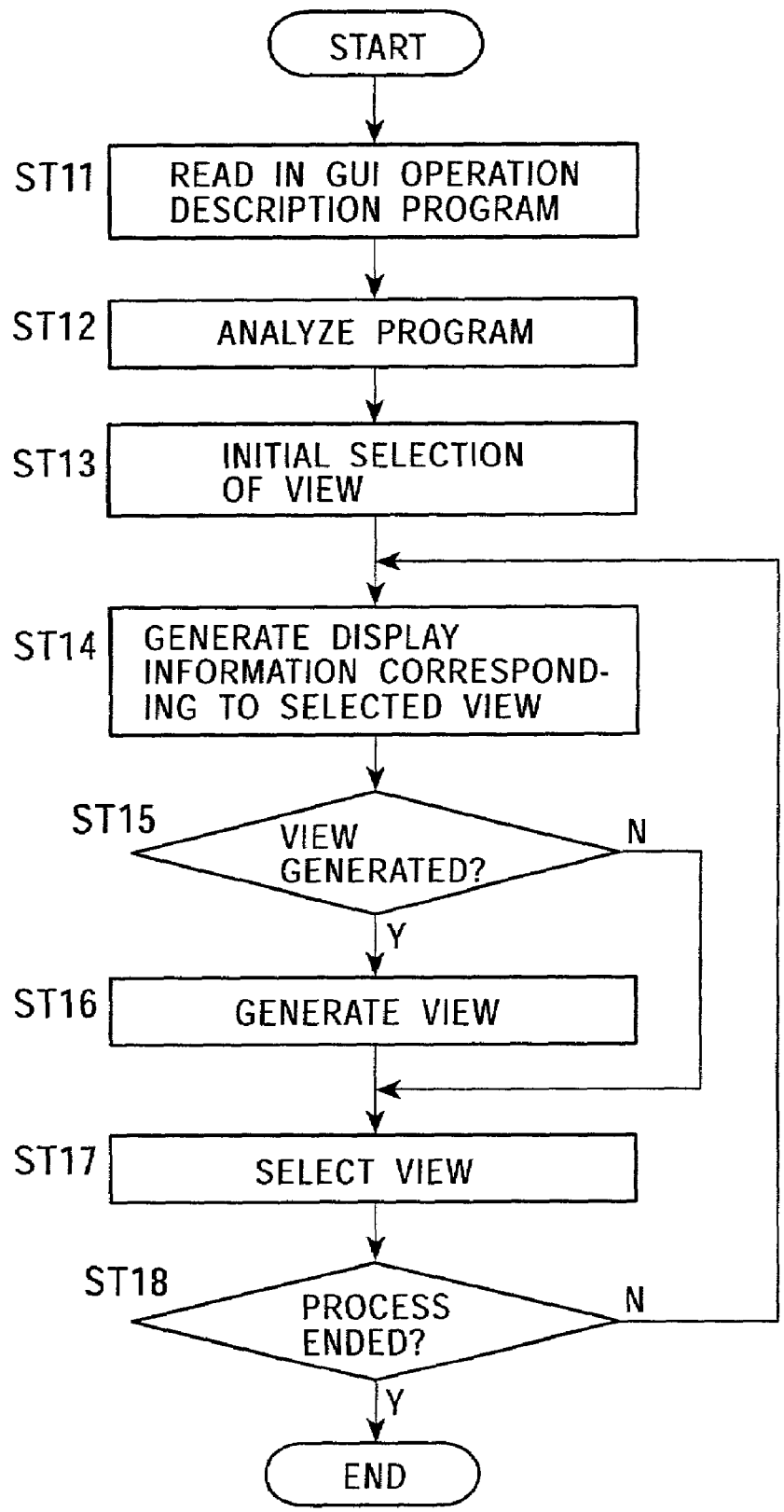

MACROCOSM

FIG. 13

```
view-node#1{
    view-style:scroll;
    node-id:2,3;
}
view-node#2{
    view-style:scroll;
    node-id:6;
}
view-node#3{
    view-style:scroll;
    node-id:1,6,8;
}
view-node#4{
    view-style:scroll;
    node-id:3,7;
}
```
(xi)

```
<view>
<view-nodeid="1"children="2,3"view-factor="design"/>
<view-nodeid="2"parent="1"children="4"view-factor="design"/>
<view-nodeid="3"parent="1"view-factor="design"/>
<view-nodeid="4"parent="2"view-factor="design"/>
</view>
```
(xii)

FIG. 14

```
<macrocosm>
<universe>
    <nodeid="1"children="2,3,4"object-type="image"
content-type"image/jpg"data="uri//foo1.bar"/>
    <nodeid="2"parent="1"children="9"object-type="image"
content-type"image/jpg"data="uri//foo2.bar"/>
    <nodeid="3"parent="1,5"children="7"object-type="image"
content-type"image/jpg"data="uri//foo3.bar"/>
    <nodeid="4"parent="5"children="7"object-type="image"
content-type"image/jpg"data="uri//foo4.bar"/>
</universe>
```
⎤
⎥ (xiii)
⎦

```
<universe>    <nodeid="4"parent="5"children="7"
object-type="image"content-type"image/jpg"data="uri//foo4.bar"/>
    <nodeid="5"children="3,4,6"object-type="image"
content-type"image/jpg"data="uri//foo5.bar"/>
    <nodeid="6"parent="1,5"children="8"object-type=image"
content-type"image/jpg"data="uri//foo6.bar"/>
</universe>
```
⎤
⎥ (xiv)
⎦

```
<universe>
    <nodeid="6"parent="1,5"children="8"object-type="image"
content-type"image/jpg"data="uri//foo6.bar"/>
    <nodeid="7"parent="3,4"children="9"object-type="image"
content-type"image/jpg"data="uri//foo7.bar"/>
    <nodeid="8"parent="6"children="9"object-type="image"
content-type"image/jpg"data="uri//foo8.bar"/>
    <nodeid="9"parent="2,7"object-type="image"
content-type"image/jpg"data="uri//foo9.bar"/>
</universe>
```
⎤
⎥ (xv)
⎦

GRAPHICAL USER INTERFACE UTILIZING A PLURALITY OF NODE PROCESSING MEANS FOR VIEW/DRAWING INCLUDING ANALYSIS, SELECTION, DISPLAY CONTROL, VIEW GENERATION AND RE-GENERATION

CROSS REFERENCE TO RELATED APPLICATIONS

The present application claims priority to Japanese Patent Application No. JP 2001-034331, and the disclosure of such application is herein incorporated by reference to the extent permitted by law.

BACKGROUND OF THE INVENTION

1. Field of the Invention

The present invention relates to a screen display controlling method, a program and a screen display controlling apparatus, which can automatically generate on a GUI (Graphical User Interface) display, a customized GUI display adapted to a particular user, based on the user's operation history.

2. Description of Related Art

In an apparatus such as a computer or the like, a user performs operation of a menu screen of an application program currently in execution through a keyboard, a mouse and/or the like so that execution of another, new application program, an image display, an audio output, a text display or the like are carried out based on such operation carried out by the user.

However, conventionally, in the menu display indicated on a display unit of a computer or the like, an application program is fixed to a predetermined pattern. Thus, such display is not always convenient or suitable for each particular user.

Also, an interface of a conventional electronic apparatus, such as an audio apparatus, a visual apparatus and the like, is assembled within each product. Although this enabling definition of fine operation of each product, this causes lack of versatility or generality. Such lack of versatility gives rise to the need of a program for performing the so-called authoring. As a result, it is difficult to generate an intuitive creation tool using a visual interface under a conventional application program. Moreover, the related or conventional art has not provided a function for generating the interface by improving the degree of abstraction as a concept for generating the interface to, then, carrying out a declarative description.

SUMMARY OF THE INVENTION

The present invention has been conceived in view of the above mentioned problems. Therefore, it is preferable according to a preferred embodiment of the present invention to provide a display controlling method, a program and a display controlling apparatus, which can automatically provide an interface screen complying with each user, i. e., customized for each user on the basis of an operation which is characteristic to each user.

It is also preferable according to the present invention to provide a display controlling method, a program and a display controlling apparatus, which can easily carry out centralized management of menu screens or the like for a plurality of electronic apparatuses.

Still another preferable feature of the present invention is to provide a display controlling method, a program and a display controlling apparatus, which can easily generate a diversified interface display.

In order to alleviate the above-mentioned problems of the conventional art, a display controlling method to a first preferred embodiment of the present invention carries out a process in which a view is selected and an image corresponding to a node specified by the selected view is processed in the drawing style specified by the view. This view selection is done based on a program including a plurality of nodes each serving as a data group indicating a static attribute of a link to referential data or actual referential data and each serving as a constitutive unit for a drawing; and a plurality of views each serving as a data group for specifying: the node carrying out the drawing and a drawing style corresponding to the node.

According such preferable embodiment of the present invention, apart from the node for specifying the link to the referential data or the actual referential data, the concept of the view serving as the data group for specifying the node carrying out the drawing and the drawing style on the screen of the node is introduced. In addition, based on the program including (describing) the view, the views are selected in sequence in order to, accordingly, displaying the image corresponding to the node. As a result, the user can easily generate various interface displays.

In addition, the display controlling method according to the first preferred embodiment of the first invention determines a next/another view to be selected, according to an operation carried out by a user in accordance with a current display.

This allows an automatic generation of an interface display adapted to each user, in accordance with the peculiarity of the user operation.

Also, the display controlling method of the first preferred embodiment of the present invention preferably generates a new view in accordance with an operation history, i.e., historic record of operation carried out by the user.

The display controlling method according to the first preferred embodiment of the present invention preferably selects the generated new view as mentioned above and then carries out displaying.

The display controlling method according to the first preferred embodiment of the present invention, still preferably, analyzes the program and generates a tree structure information of the node and the view and, based on such tree structure information, carries out the selection of the view, the process for the displaying operation and the determination of the next view to be selected.

In the display controlling method according to the first preferred embodiment of the present invention, the referential data is preferably image data, audio data or text data, which are stored in any communication apparatus connected to a network.

Still in the display controlling method according to the first preferred embodiment of the present invention, preferably, the node further indicates an attribute of the referential data.

In the display controlling method according to the first preferred embodiment of the present invention, preferably, the program further includes a data group indicating mutual relationship between the plurality of nodes.

In addition, in the display controlling method of the first preferred embodiment of the present invention, preferably, the program further has a data group indicating a transition style of the view.

A program according to a second preferred embodiment of the present invention instructs a computer to execute: a procedure of selecting a view and carrying out a process for displaying an image corresponding to a node specified by the selected view, on a screen under the drawing style specified by the view, based on a program including: a plurality of nodes each serving as a data group indicating a static attribute of a link to referential data or an actual referential data and each serving as a constitutive unit of a drawing, and a plurality of views each serving as a data group for specifying: the node carrying out the drawing and a drawing style on a screen of the node;.

Also preferably, the program according to the second preferred embodiment of the present invention further instructs the computer to execute a procedure for determining a next view to be selected, on the basis of an operation carried out by a user in accordance with the display.

A program according to a third preferred embodiment of the present invention includes: a plurality of nodes each serving as a data group indicating a static attribute of a link to referential data or actual referential data and each serving as a constitutive unit for a drawing; and a plurality of views each serving as a data group for specifying: the node carrying out the drawing and a drawing style on a screen of the node. The program is processed by a computer to then controlling display.

A display controlling apparatus according to a fourth preferred embodiment of the present invention includes: a memory unit for storing a program including a plurality of nodes each serving as a data group indicating a static attribute of a link to referential data or actual referential data and each serving as a constitutive unit of a drawing, and a plurality of views each serving as a data group for specifying: the node carrying out the drawing and a drawing style on a screen of the node; a program analyzer for analyzing the program and generating a tree structure information of the node and the view; a view selecting means for selecting a view based on the tree structure information and a display operation; a display controller for controlling display so that an image corresponding to the node specified by the selected view is displayed under the drawing style specified by the view, based on the tree structure information; and a view generator for newly generating the view, based on a user's operation history.

The operation of the display controlling apparatus according to the fourth preferred embodiment of the present invention is carried out as follows.

At first, the program is read out from the memory unit. The read out program is analyzed by the program analyzer to then generate the tree structure information. The view selector selects the view on the basis of the tree structure information and the operation on the screen carried out by the user. Then, the display controller carries out the control so that in accordance with the tree structure information, the image corresponding to the node specified by the selected view is displayed on the screen in the drawing style specified by the view. Next, the view generator generates the new view, in accordance with the history of the operation carried out by the user.

A display controlling method according to a fifth preferred embodiment of the present invention carries out a process, in which, in accordance with a program including: a plurality of nodes each serving as a data group indicating a static attribute of a link to referential data or actual referential data in order to display images for operation or status images for a plurality of electronic apparatuses and each serving as a constitutive unit of a drawing; and a plurality of views each serving as a data group for specifying: the node carrying out the drawing and a drawing style on a screen of the node, the view is selected, and an image corresponding to the node specified by the selected view is accordingly displayed on a display on the drawing style specified by the view.

According to the display controlling method of the fifth preferred embodiment of the present invention, the view specifies nodes corresponding to a plurality of electronic apparatuses, and carries out a process for displaying the images for operation or the status images for the plurality of electronic apparatuses corresponding to the plurality of nodes specified by the view, on one display.

A program according to a sixth preferred embodiment of the present invention instructs a computer to execute a procedure, which, in accordance with a program including: a plurality of nodes each serving as a data group indicating a static attribute of a link to referential data or actual referential data in order to display an image/images for operation or a status of images for a plurality of electronic apparatuses and each serving as a constitutive unit of a drawing; and a plurality of views each serving as a data group for specifying: the node carrying out the drawing and a drawing style on a screen of the node, selects the view, and carries out a process for displaying an image corresponding to the node specified by the selected view, on a display/screen on the drawing style specified by the view.

As mentioned above, according to the preferred embodiments of the present invention, it is possible to provide the display controlling method, the program and the display controlling apparatus, which can automatically provide the display, such as an interface display or the like complying with each user, i. e., customized, based on the peculiarity of user's operation.

Also, according to the preferred embodiments of present invention, it is possible to provide the display controlling method, the program and the display controlling apparatus, which can easily carry out the collective management of the menu displays of a plurality of electronic apparatuses or the like.

Moreover, according to the preferred embodiments of the present invention, it is possible to provide the display controlling method, the program and the display controlling apparatus, which can easily generate a variety of screens/displays such as interfaces or the like.

BRIEF DESCRIPTION OF THE DRAWINGS

The above and other objects, features and advantages of the present invention will become more apparent to those skilled in the art from the following description of the presently preferred exemplary embodiments of the invention taken in conjunction with the accompanying drawings, in which:

FIG. 6 is a shows an example of a GUI operation description program described by using XML and CSS, according to the first preferred embodiment of the present invention;

FIG. 11 is a flowchart illustrating an example of operation of the computer 1 shown in FIG. 1 when a new GUI screen in which an operation history of a user on a GUI screen is reflected is generated, according to the first preferred embodiment of the present invention;

FIG. 13 illustrates an example of GUI operation description program for describing the structure of the nodes and the views shown in FIG. 12, according to the first preferred embodiment of the present invention;

FIG. 14 illustrates an example of GUI operation description program for describing the structure of the nodes and the views shown in FIG. 12, according to the first preferred embodiment of the present invention;

DETAILED DESCRIPTIONS OF THE PREFERRED EMBODIMENTS OF THE INVENTION

A computer and a communication system according to preferred embodiments of the present invention will be described below.

First Embodiment

Figure 1:
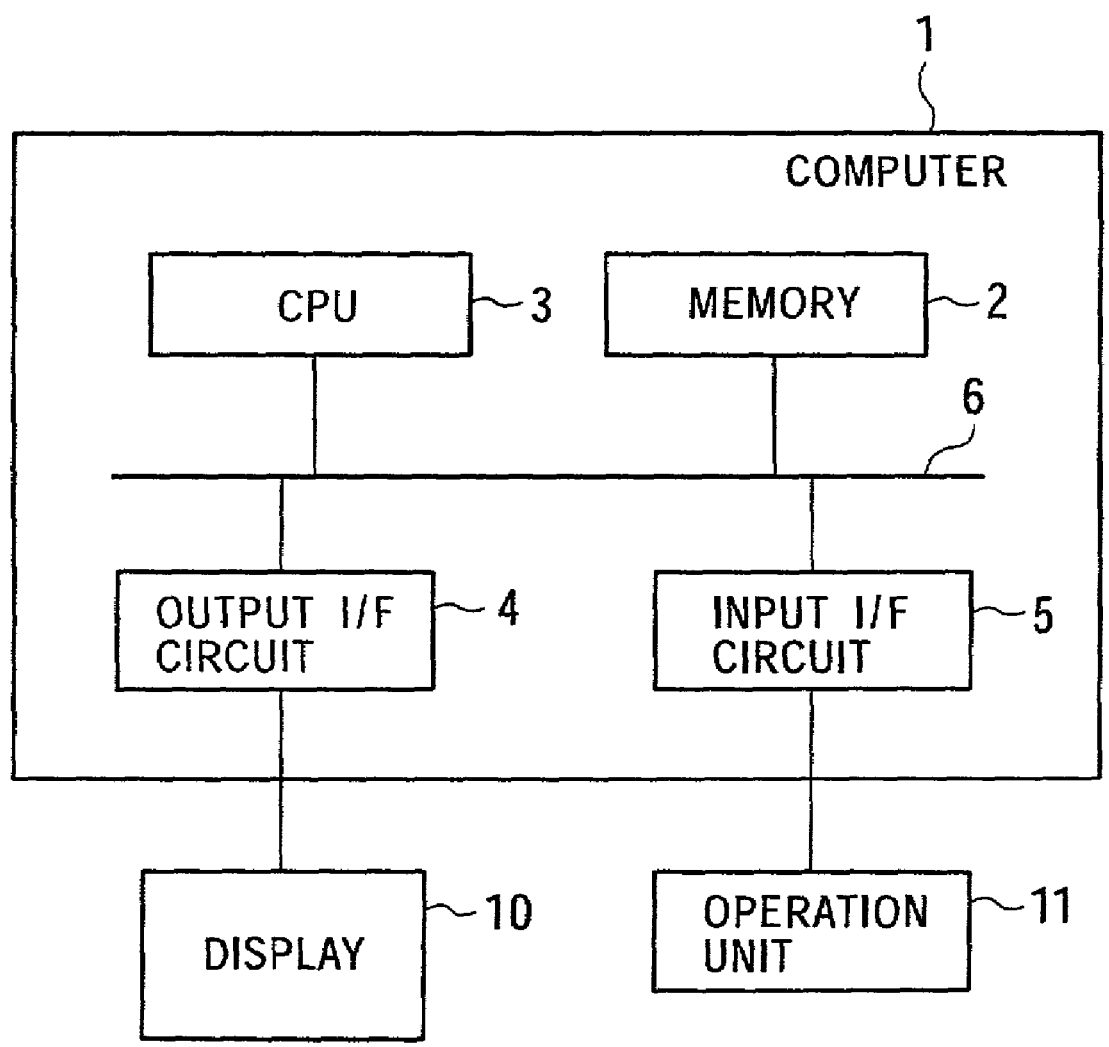
FIG. 1 shows a configuration of a computer according to a first preferred embodiment of the present invention.

FIG. 1 is a structural diagram showing a configuration of a computer 1.

As shown in FIG. 1, the computer 1 has, for example, a memory 2, a CPU 3, an output interface circuit 4 and an input interface circuit 5. The memory 2, the CPU 3, the output interface circuit 4 and the input interface circuit 5 are connected to each other through an inner bus 6. A display apparatus 10 is connected to the output interface circuit 4.

An operation unit 11, such as a keyboard, a mouse and/or the like, is connected to the input interface circuit 5.

In addition, the computer 1 is connected to a communication line, and data can be downloaded from a server apparatus connected to the communication line by using the Internet or the like.

Here, the computer 1 corresponds to a display controlling apparatus of the present invention. Also, the memory 2 corresponds to a memory unit or storage medium of the present invention.

The respective members shown in FIG. 1 will be described below.

[Memory 2]

Figure 2:
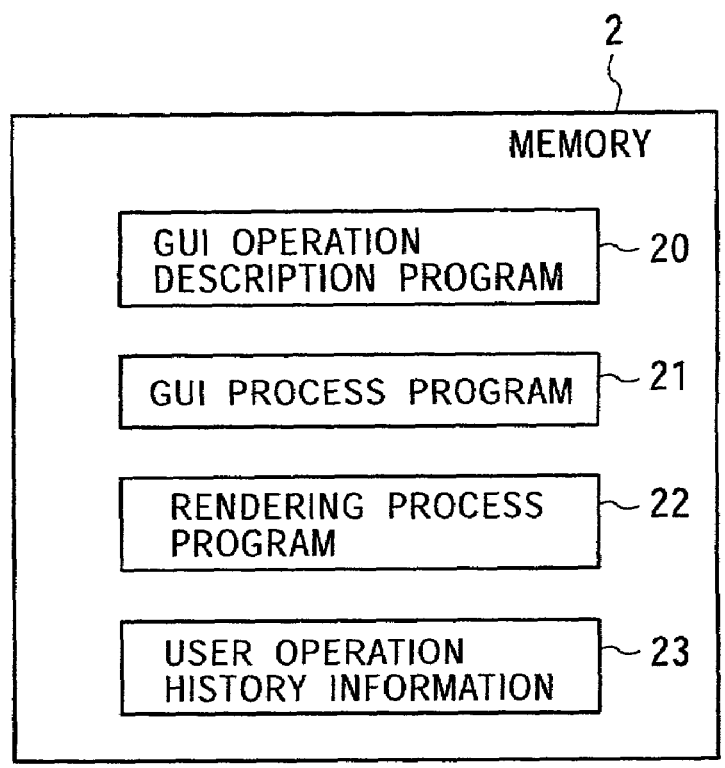
FIG. 2 is a view describing information stored in the memory shown in FIG. 1, according to the first preferred embodiment of the present invention.

FIG. 2 is a block diagram illustrating information to be stored in the memory 2. As shown in FIG. 2, the memory 2 stores therein a GUI operation description program 20, a GUI processing program 21, a rendering processing program 22 and a user operation history information 23. Here, the GUI operation description program 20 corresponds to a program of the present invention.

The GUI operation description program 20 is described by, for example, a user. It describes the information with regard to a plurality of nodes each serving as a constitutive unit of a drawing in GUI and each serving as a data group indicating a static attribute of a link to referential data or an actual body of the referential data. The referential data is, for example, the data of a text, a static image or a dynamic image. The GUI operation description program 20 describes the relationship between the nodes.

Also, the GUI operation description program 20 includes a plurality of views serving as a data group for specifying the node carrying out the drawing and a drawing style on that screen.

That is, the view is intended to provide a tree structure for defining how each node is viewed, apart from a target node drawn on the screen. The GUI operation description program 20 describes a master-slave relationship between the views. The view is not statically present, and it can be dynamically generated in accordance with a history of views carried out by the user until now.

The GUI operation description program 20 describes, for example, a tag set to represent the structure of each element, such as the node, the view or the like, and a procedure for operating the element. The tag set is represented by using XML (extensible Markup Language), and the procedure is represented by using CSS (Cascading Style Sheets).

Since the XML is used for the representation of the tag set as mentioned above, the mixture of the descriptions resulting from a later expansion and other markup languages can be easily attained only by introducing a so-called name space.

Figure 3:
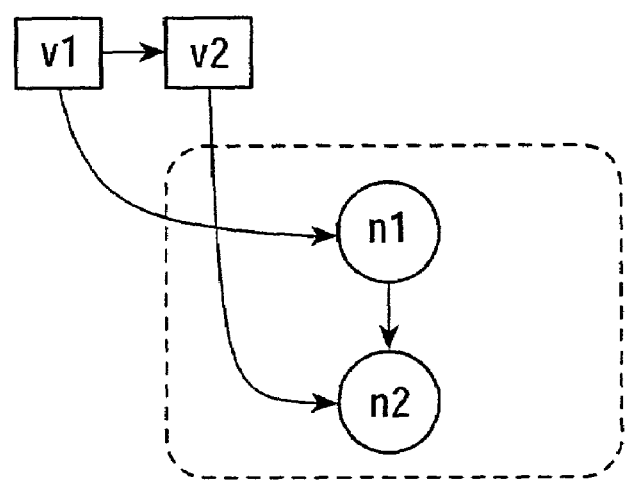
FIG. 3 is a view describing the GUI operation description program shown in FIG. 2, according to the first preferred embodiment of the present invention.

For example, as shown in FIG. 3, if a node n1 is displayed on a screen in a view v1 and a node n2 is displayed on the screen in a view v2, the descriptions with regard to the nodes n1, n2 and the views v1, v2 are included in the GUI operation description program 20.

The GUI processing program 21 is executed by the CPU 3, and it is the program for processing the GUI operation description program 20 and then generating a GUI operation request.

The rendering processing program 22 is executed by the CPU 3, and it is the program for carrying out a rendering process in accordance with the GUI operation request and then generating a display signal.

The user operation history information 23 is the history information of operations carried out by the user using the operation unit 11 in accordance with the GUI screen/display. The user operation history information 23 is generated by, for example, the CPU 3.

[CPU 3]

Figure 4:
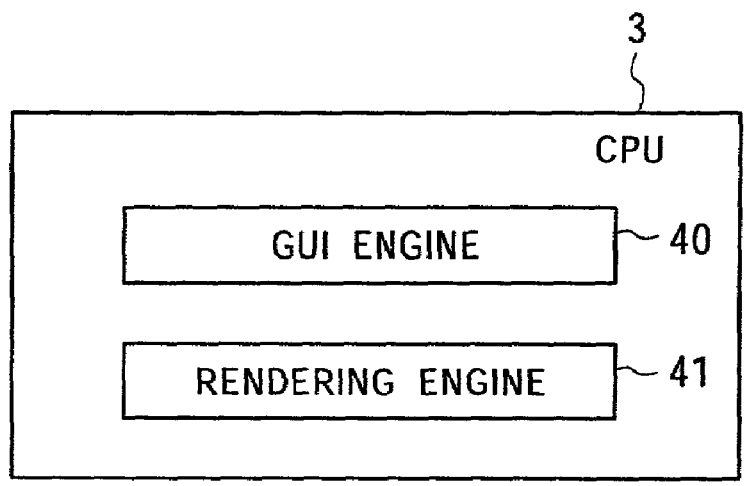
FIG. 4 is a functional block diagram describing the CPU shown in FIG. 1, according to the first preferred embodiment of the present invention.

The CPU 3 generally controls the processes in the computer 1, and executes the programs, such as the GUI processing program 21 and the rendering processing program 22 which are read out from the memory 2 and the like, in accordance with an operation signal received from the operation unit 11 through the input interface circuit 5 and the inner bus 6. FIG. 4 is a functional block diagram of the CPU 3. As shown in FIG. 4, the CPU 3 functions as a GUI engine 40 and a rendering engine 41. The GUI engine 40 is attained by the GUI processing program 21 executed by the CPU 3. Also, the rendering engine 41 is attained by the rendering processing program 22 executed by the CPU 3. By the way, the GUI engine 40 and the rendering engine 41 may be constituted by hardware different from the CPU 3.

Figure 5:
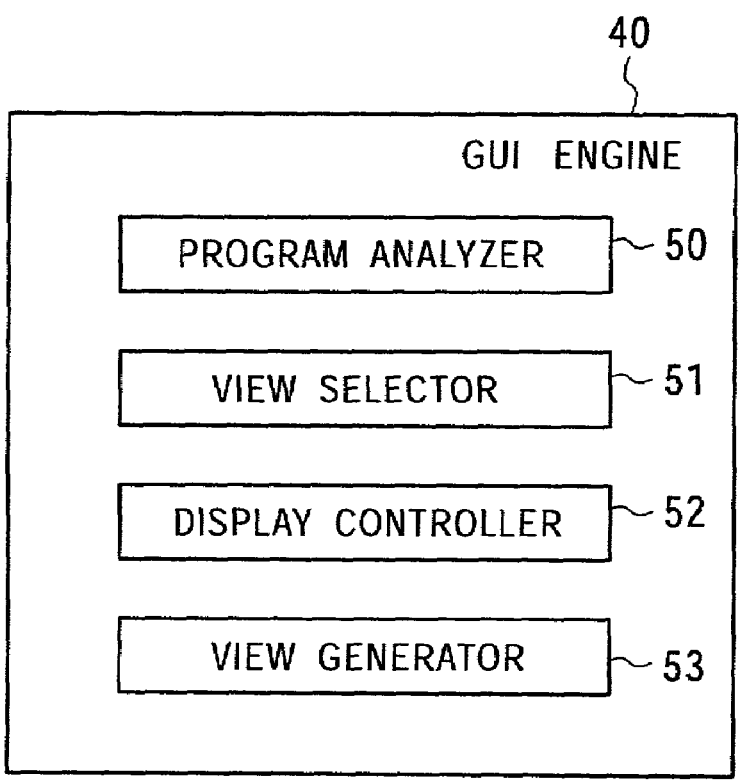
FIG. 5 is a functional block diagram of the GUI engine shown in FIG. 4, according to the first preferred embodiment of the present invention.

FIG. 5 is a functional block diagram of the GUI engine 40.

The functions of the respective portions shown in FIG. 5 are attained by the GUI processing program 21 executed by the CPU 3. As shown in FIG. 5, the GUI engine 40 has, for example, a program analyzer 50, a view selector 51, a display controller 52 and a view generator 53. Here, the program analyzer 50 corresponds to a program analyzer of the present invention, the view selector 51 corresponds to a view selector of the present invention, the display controller 52 corresponds to a display controller of the present invention, and the view generator 53 corresponds to a view generator of the present invention.

The program analyzer (XML purser) 50 analyzes the structure of the GUI operation description program 20, and generates the tree structure of DOM (Document Object Model) of the element (node or view) having an attribute. The view selector 51 selects the view on the basis of the result analyzed by the program analyzer 50 and the operation on the screen done by the user. The display controller 52 carries out the control so that the image corresponding to the node specified by the view selected by the view selector 51 is displayed on the screen in the drawing style specified by the view, in accordance with the result analyzed by the program analyzer 50. The display controller 52, for example, generates a display information, and outputs it to the view selector 51 shown in FIG. 5. The view generator 53 generates the view complying with the property of the operation of the user, in accordance with the user operation history information 23 stored in the memory 2 shown in FIG. 2.

[Output Interface Circuit 4]

The output interface circuit 4 receives the display signal generated by the CPU 3 through the inner bus 6, and outputs it to the display apparatus 10.

[Input Interface Circuit 5]

The input interface circuit 5 receives from the operation unit 11 based on the operation of the user, and outputs it through the inner bus 6 to the CPU 3.

[Display Apparatus 10]

The display apparatus 10 (or, simply, display 10) carries out the display corresponding to the display signal received from the output interface circuit 4. In this embodiment, the GUI screen is displayed on the display apparatus 10.

[Operation Unit 11]

The operation unit 11 is a mouse or a keyboard. It outputs the operation signal corresponding to the operation of the user to the input interface circuit 5.

An example of operation of the computer 1 will be described below.

[First Example of Operation]

An operation for generating the node by using the view in the computer 1 will be described below by using an easy example. First, the GUI operation description program 20 used in the example of operation is explained. FIG. 6 is a view showing an example of the GUI operation description program 20 described by using the XML and the CSS, and FIG. 7A to FIG. 7E are views visually representing the meaning of each code shown in FIG. 6. Respective codes shown in FIG. 6 will be described below.

Figure 7A:
FIG. 7A to FIG. 7E are graphic representations of meanings of each code shown in FIG. 6, according to the first preferred embodiment of the present invention.

As for Code (i), shown in FIG. 7A, this indicates that there is a view (a view of the present invention) v1 having an identification number "1" and a style description explicitly specifies a node. Also, as shown in FIG. 7A, this indicates that there is a view v2 having an identification number "2" and the style description. explicitly specifies a node.

Figure 7B:
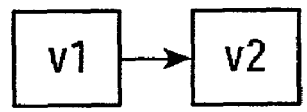

As for Code (ii), as shown in FIG. 7B, if an item is selected in the view v1, the selected item is expanded and displayed by a zoom effect. Then, this indicates a transition (shift) to the view v2.

As for Code (iii), this indicates a time necessary for the zoom effect described in the code (ii).

Figure 7C:

As for Code (iv), as shown in FIG. 7C, this indicates that there is a node n1 having an identification number "1", the node is an image object, and a type of a content indicated by the object is JPEG (Joint Photographic Experts Group). It indicates an address (URL, URI) at which the data of the static image is present. Also, as shown in FIG. 7C, this indicates that there is a node n2 having an identification number "2", the node is an image object, and a type of a content indicated by the object is GIF (Graphics Interchange Format). Moreover, it indicates an address at which the data of the static image is present.

Figure 7D:

As Code (v), as shown in FIG. 7D, this indicates that the node n2 is a slave of the node n1.

Figure 7E:
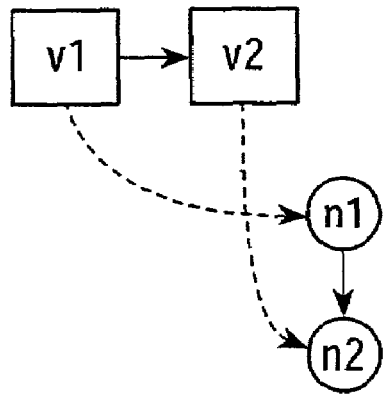

As Code (vi), as shown in FIG. 7E, this indicates that the view v1 specifies the node n1 and that a style of a screen transition (shift) of the view v1 is a scrolling type. Also, this indicates that the view v2 has the node n2 and that the style of screen transition of the view v1 is a switching based on an icon placed on a first line and a first row.

Figure 8:
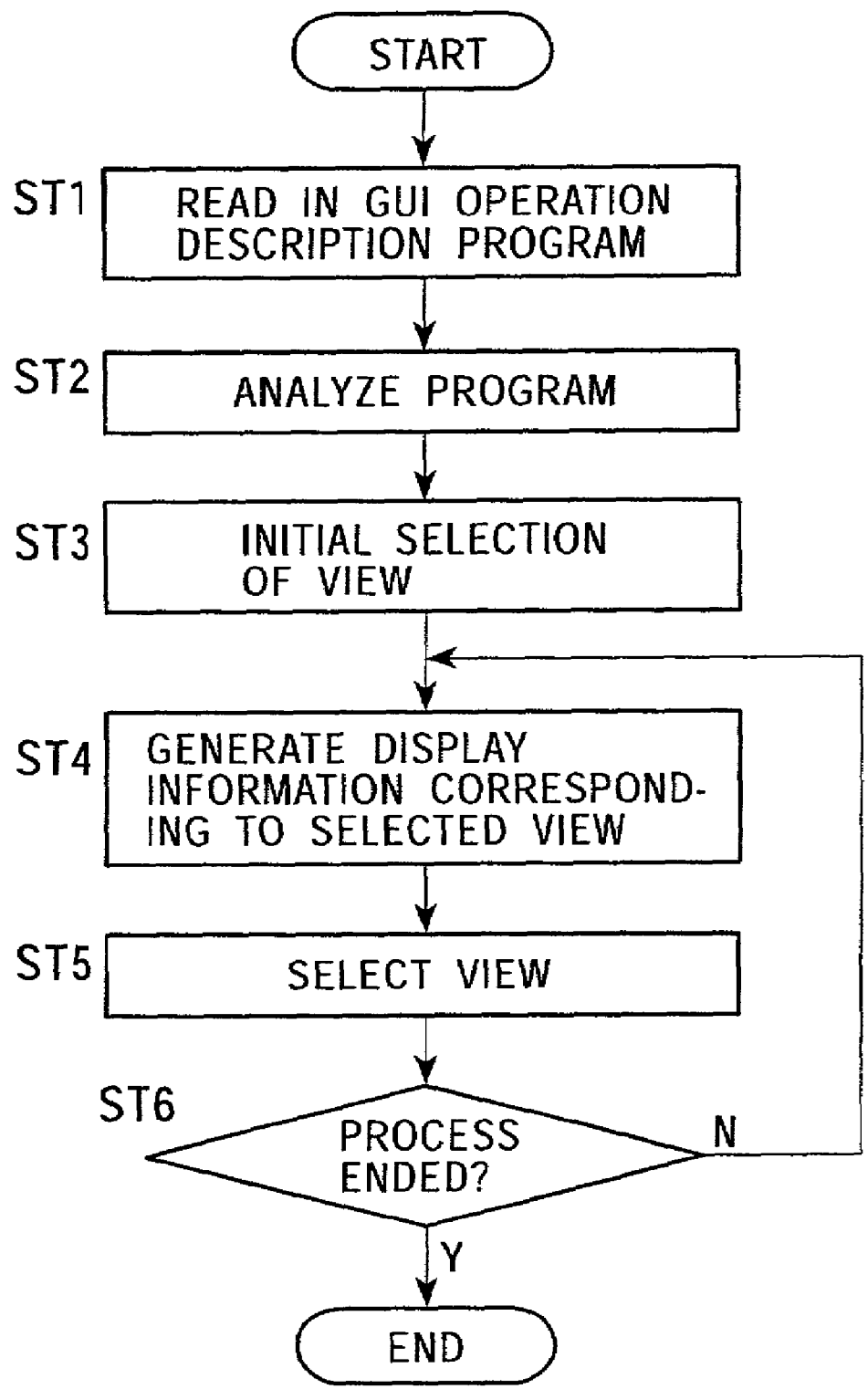
FIG. 8 is a flowchart illustrating an example of operation of the computer 1 (shown in FIG. 1) when the GUI operation description program shown in FIG. 6 is utilized, according to the first preferred embodiment of the present invention.

An example of operation of the computer 1 in the case of the usage of the GUI operation description program 20 shown in FIG. 6 will be described below. FIG. 8 is a view explaining the example of operation.

In Step ST1, the GUI operation description program 20 stored in the memory 2 shown in FIG. 2 is read out by the CPU 3.

In Step ST2, the program analyzer 50 of the GUI engine 40 of the CPU 3 shown in FIG. 5 analyzes the GUI operation description program 20 read at the step ST1, and the tree structure information (the analysis result according to the preferred embodiment of the present invention) is generated, indicating the tree structure of the node and the view described in the GUI operation description program 20.

In Step ST3, the view selector 51 shown in FIG. 5 selects, for example, an initial view described in the GUI operation description program 20, in accordance with the tree structure information.

In Step ST4, the display controller 52 shown in FIG. 5 generates the display information to display the image corresponding to the node specified by the view selected by the view selector 51, in accordance with the tree structure information, on the GUI screen in the drawing style specified by the view.

In Step ST5, the display controller 52 shown in FIG. 5, if the user specifies a node by operating the operation unit 11 tin accordance with the GUI screen, determines a view to be selected next in response to the operation.

In Step ST6, the CPU 3 judges whether or not the processes based on the GUI operation description program 20 are ended. If judging that they are ended, the CPU 3 ends the processes shown in FIG. 8. If the CPU 3 judges that they are not ended, the operational flow returns back to the process at the step ST4.

Figure 9A:
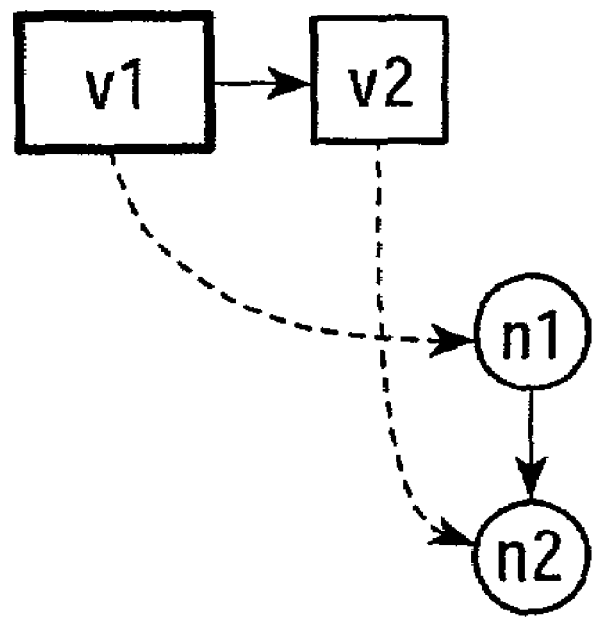
FIG. 9A and FIG. 9B illustrates an actual example of the operation example shown in FIG. 8 by using the GUI operation description program shown in FIG. 6, according to the first preferred embodiment of the present invention.
Figure 10A:
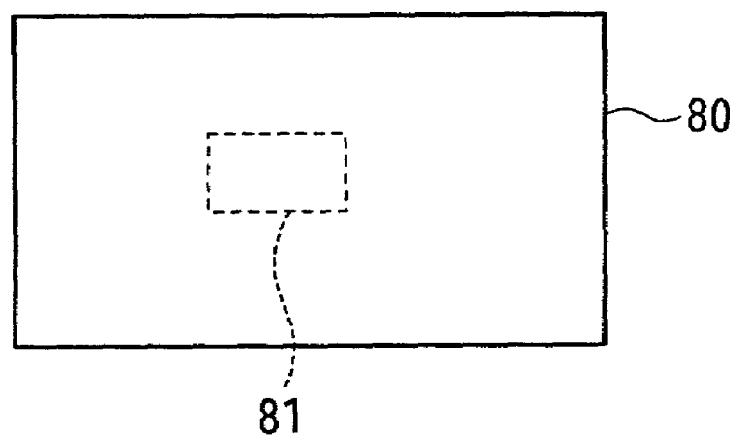
FIG. 10A to FIG. 10C are diagrams describing the operation shown in FIG. 9A and FIG. 9B, according to the first preferred embodiment of the present invention.

The above-mentioned example of operation will be actually described below by using the GUI operation description program 20 shown in FIG. 6. First of all, as shown in FIG. 9A, the view v1 specifying the node n1 is selected as the initial view, in Step ST3. Then, the display information is generated for displaying the image corresponding to the static image data of the JPEG, which is referred to by the node n1, in Step ST4. Thus, a GUI screen 80 including an image 81 corresponding to the static image data is displayed on the display apparatus 10, as shown in FIG. 10A.

Figure 9B:
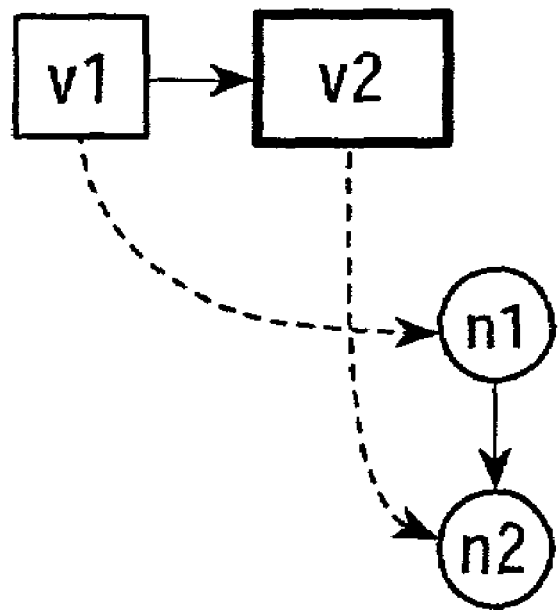
Figure 10B:
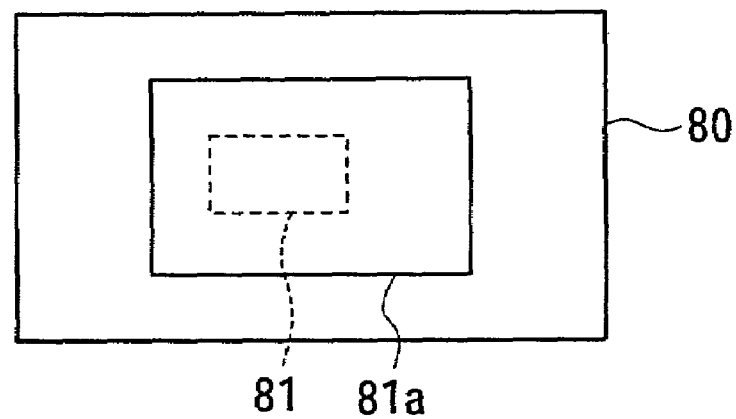
Figure 10C:
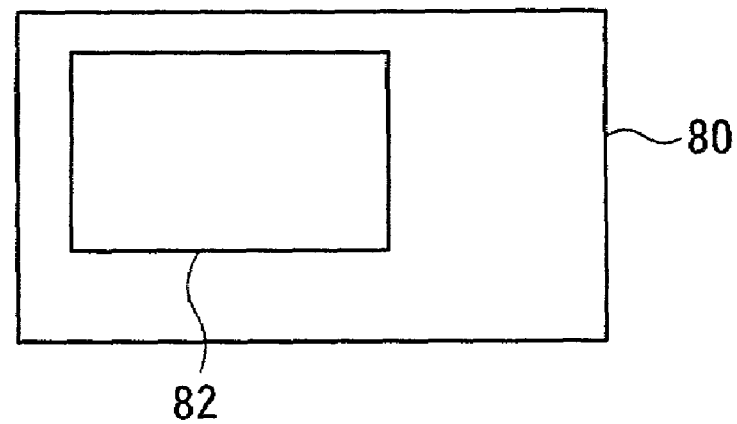

Next, if the user specifies the image 81 by operating the operation unit 11, the image 80 is zoomed and expanded. As shown in FIG. 10B, an image 81a in which the image 81 is expanded is displayed on the GUI screen 80. As shown in FIG. 9B, the view v2 specifying the node n2 is selected, in Step ST3. Then, the display information is generated for displaying the image corresponding to the image data of the GIF, which is referred to by the node n2, in Step ST4. Thus, as shown in FIG. 10C, the GUI screen 80 including an image 82 corresponding to the GIF image data is displayed on the display apparatus 10.

[Second Example of Operation]

An example of operation of the computer 1 when a new GUI screen is generated will be described below, in which the operation history of the user on the GUI screen is reflected.

FIG. 11 is a flowchart explaining the example of operation.

In Step ST11, the GUI operation description program 20 stored in the memory 2 shown in FIG. 2 is read in the CPU 3.

In Step ST12, the program analyzer 50 of the GUI engine 40 of the CPU 3 shown in FIG. 5 analyzes the GUI operation description program 20 read at the step ST11, and the tree structure information (the analysis result of the present invention) indicating the tree structure of the node and the view described in the GUI operation description program 20 is generated.

In Step ST13, the view selector 51 shown in FIG. 5 selects, for example, the initial view described in the GUI operation description program 20, in accordance with the tree structure information.

In Step ST14, the display controller 52 shown in FIG. 5 generates the display information to display the image corresponding to the node specified by the view selected by the view selector 51, in accordance with the tree structure information, on the GUI screen in the drawing style specified by the view.

In Step ST15, the view generator 53 shown in FIG. 5 judges whether or not a new view is selected. If the new view is judged to be generated, the operational flow proceeds to a step ST16. If it is not judged, the operational flow proceeds to a step ST17. Actually, for example, the view generator 53 judges that the new view is generated, if a predetermined pattern, in which the reflection in a next GUI screen is considered to be effective depending on the operation property of the user on the GUI screen, is present within the user operation history information 23 read out from the memory 2.

In Step ST16, if the user specifies a node by operating the operation unit 11 in accordance with the GUI screen, the display controller 52 shown in FIG. 5 determines a view to be selected next in accordance to the operation. At this time, the display controller 52 determines, for example, the new view generated at the step ST15 as the view to be selected next.

In Step ST17, if the user specifies the node by operating the operation unit 11 in accordance with the GUI screen, the display controller 52 shown in FIG. 5 determines the view to be selected next, in accordance to the operation.

In Step ST18, the CPU 3 judges whether or not the processes based on the GUI operation description program 20 are ended. If judging that they are ended, the CPU 3 ends the processes shown in FIG. 11. If the CPU 3 judges that they are not ended, the operational flow returns back to the process at the step ST14.

Other types of the nodes and the views that can be represented by the GUI operation description program 20 will be described below.

Figure 12:
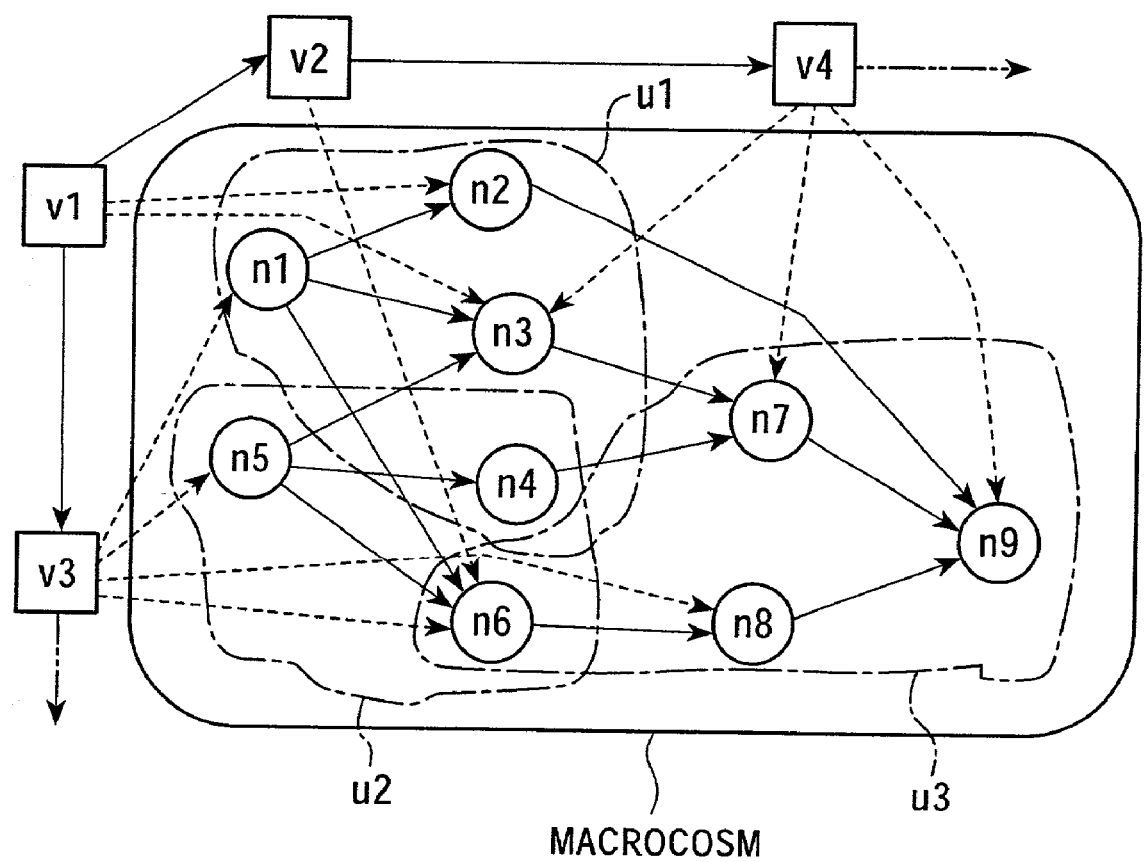
FIG. 12 is a diagram representing other nodes and views defined by a GUI operation description program, according to the first preferred embodiment of the present invention.

FIG. 12 is a diagram representing the other nodes and views defined by the GUI operation description program 20. In this case, nodes n1 to n9 and views v1 to v4 are defined as shown in FIG. 12. Here, the concept of universe is introduced. The universe is an element indicating a meaningful set of a node or a plurality of nodes, and it contains therein one or more node elements.

In this embodiment, as shown in FIG. 12, the nodes n1 to n4 serve as slave elements of a universe u1, the nodes n4 to n6 serve as slave elements of a universe u3, and the nodes n7 to n9 serve as slave elements of a universe u3. Also, the universes u1 to u3 serve as subsidiary elements of a "macrocosm".

The structure of the node and the view shown in FIG. 12 is described by the GUI operation description program 20, for example, as follows. FIG. 13 and FIG. 14 are views explaining the GUI operation description program 20 for describing the structure of the node and the view shown in FIG. 12.

In FIG. 13, Code xii indicates that the view v1 specifies the nodes n2, n31 and that the style of the screen transition of the view v1 is the scrolling type. This indicates that the view v2 specifies the node n6 and that the style of the screen transition of the view v2 is the scrolling type. Also, this indicates that the view v3 specifies the nodes n1, n6, and n8 and that the style of screen transition of the view v3 is the scrolling type. Moreover, this indicates that the view v4 specifies the nodes n3, n7 and that the style of screen transition of the view v4 is the scrolling type.

Code xii indicates that the view v1 has the views v2, v3 as the slave elements and that the node is explicitly specified by the style description. The code indicates that the view v2 has the view v1 as the master element and has the view v4 as the slave element and that the node is explicitly specified by the style description. Also, the code indicates that the view v3 has the view v1 as the slave element and that the node is explicitly specified by the style description. Moreover, it indicates that the view v4 has the view v2 as the master element and that the node is explicitly specified by the style description.

Code xiii, now in FIG. 14, indicates that the element "macrocosm" has the universe u1 as the slave element and that the universe u1 has the nodes n1, n2, n3 and n4 as the slave elements. Also, the code indicates that the slaves of the node n1 are the nodes n2, n3 and n4, the node n1 is an image data, and the image data exists in "uri/foo1.bar". It indicates that the master of the node n2 is the node n1, the slave is the node n9, the node n2 is an image data, and the image data exists in "uri/foo2.bar". Also, the code indicates that the masters of the node n3 are the nodes n1, n5, the slave is the node n7, the node n3 is an image data, and the image data exists in "uri/foo3.bar". Moreover, it indicates that the master of the node n4 is the node n5, the slave is the node n7, the node n4 is an image data, and the image data exists in "uri/foo4.bar".

Code xiv indicates that the element "macrocosm" has the universe u2 as the slave element and that the universe u2 has the nodes n4, n5 and n6 as the slave elements. The code indicates the master of the node n4 is the node n5, the slave is the node n7, the node n4 is an image data, and the image data exists in "uri/foo4.bar". Also, it indicates that the slaves of the node n5 are the nodes n3, n4 and n6, the node n5 is an image data, and the image data exists in "uri/foo5.bar". Moreover, the code indicates that the master of the node n6 is the nodes n1, n5, the slave is the node n8, the node n6 is an image data, and the image data exists in "uri/foo6.bar".

Code xv indicates that the element "macrocosm" has the universe u3 as the slave elements and that the universe u3 has the nodes n6, n7, n8 and n9 as the slave elements. This indicates that the masters of the node n6 are the nodes n1, n5, the slave is the node n8, the node n6 is an image data, and the image data exists in "uri/foo6.bar". The code indicates that the masters of the node n7 are the nodes n3, n4, the slave is the node n9, the node n7 is an image data, and the image data exists in "uri/foo7.bar". Also, the code indicates that the master of the node n8 is the node n6, the slave is the node n9, the node n8 is an image data, and the image data exists in "uri/foo8.bar". Moreover, it indicates that the masters of the node n9 are the nodes n7, n8, the node n9 is an image data, and the image data exists in "uri/foo9.bar".

As mentioned above, according to the computer 1, the user can easily generate the GUI screen having the various types by using the concept of the view in the GUI operation description program 20 and then specifying the node of the target of the display. Also, according to the computer 1, the GUI screen complying with each user can be automatically generated by automatically generating the new view on the basis of the history of the operations done by the user in accordance with the GUI screen.

Second Embodiment

Figure 15:
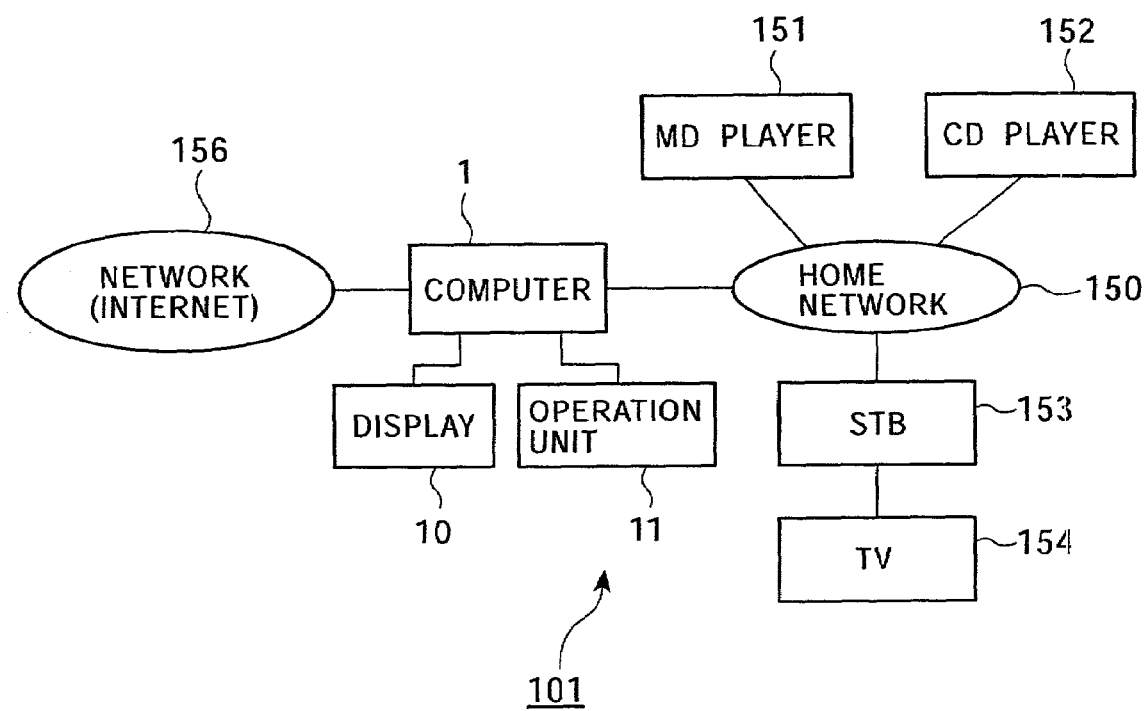
FIG. 15 shows an overview configuration of a communication system according to a second preferred embodiment of the present invention.

FIG. 15 is a view showing an overview configuration of a communication system 101 of a second preferred embodiment of the present invention.

As shown in FIG. 15, in the communication system 101, a computer 1, a MD (Mini Disc) player 151, a CD (Compact Disc) player 152 and a STB (Set Top Box) 153 are connected to each other through a home network 150. The display apparatus 10 and the operation unit 11 are connected to the computer 1, similarly to the first preferred embodiment of the invention. A television apparatus 154 is connected to the STB 153. Also, the computer 1 is connected to a network 156 such as the Internet or the like.

In this embodiment, the configuration of the computer 1 and the concepts of the nodes, the views and the universes used in the GUI operation description program 20 are similar to those of the first preferred embodiment of the present invention.

Figure 16:
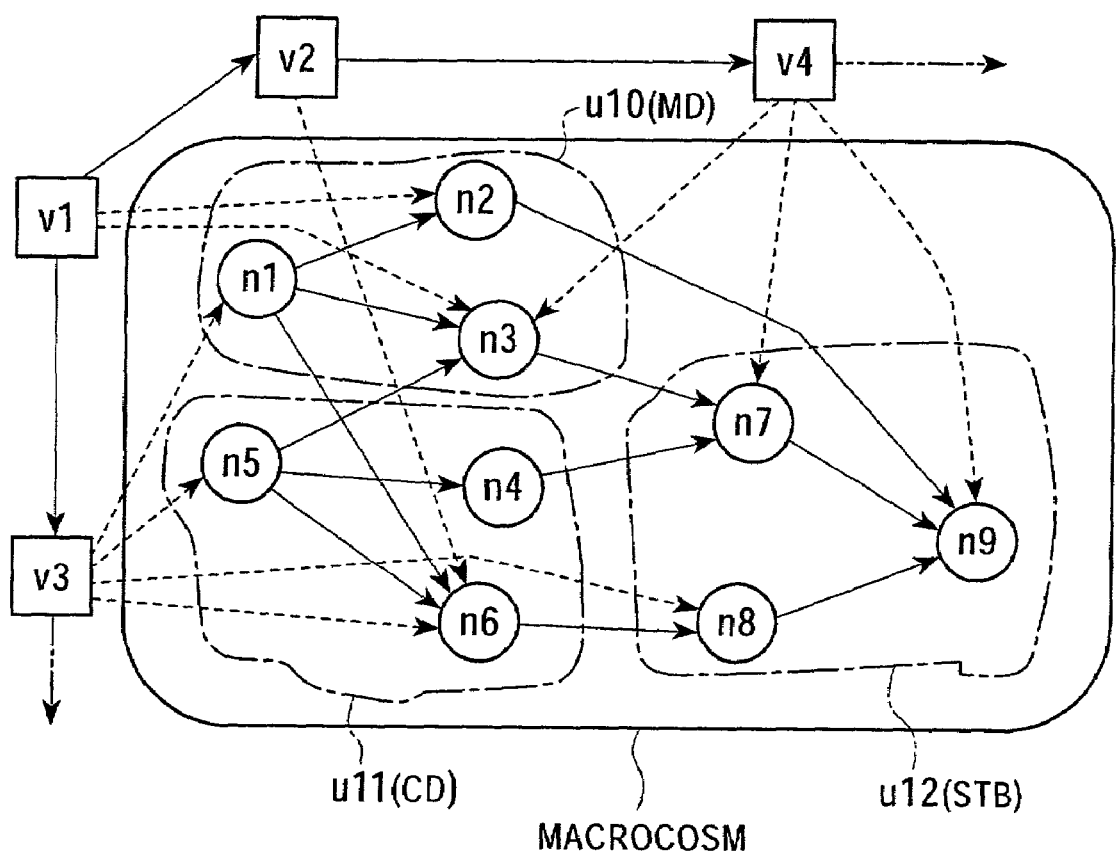
FIG. 16 is a schematic diagram representing other nodes and views defined by a GUI operation description program according to the second preferred embodiment of the present invention.

FIG. 16 is a diagram representing the other nodes and views defined by the GUI operation description program 20 of the second preferred embodiment of the present invention.

As shown in FIG. 16, in this embodiment, the GUI operation description program 20 defines the nodes n1 to n9, the views v1 to v4 and the universes u10, u11 and u12. The universe u10 has, for example, the nodes n1, n2 and n3 for displaying the menu screen in the MD player 151, as the slave elements. The universe u11 has, for example, the nodes n4, n5 and n6 for displaying the menu screen in the CD player 152, as the slave elements. In addition, the universe u12 has, for example, the nodes n7, n8 and n9 for displaying the menu screen in the STB 153, as the slave elements.

The view v1 determines/specifies the nodes n2, n3. The view v2 specifies the node n6. The view v3 specifies the nodes n1, n5, n6 and n8. And, the view v4 specifies the nodes n3, n7 and n9.

Figure 17:
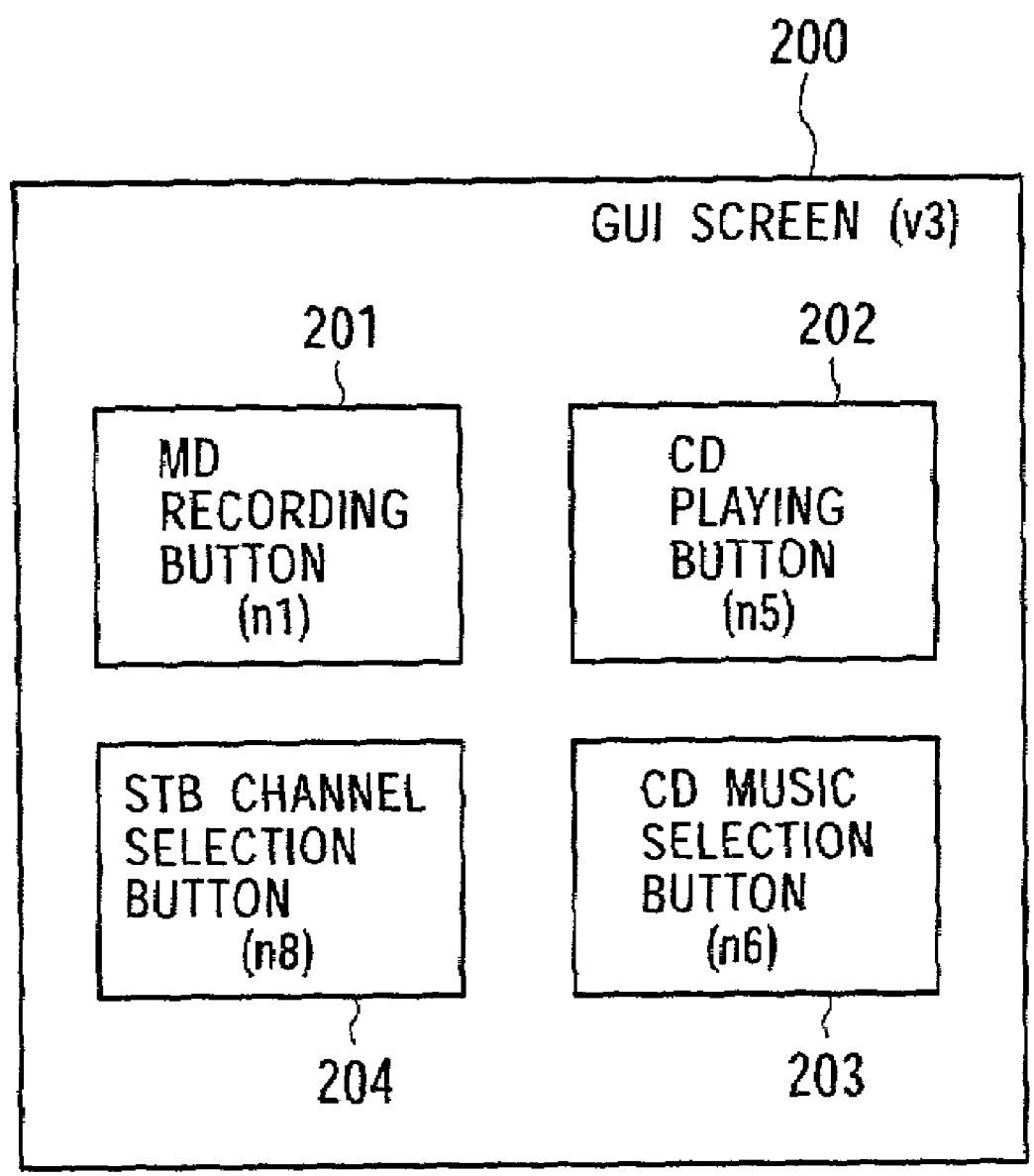
FIG. 17 is a view illustrating a GUI display in accordance to the GUI operation description program schematically shown in FIG. 16, according to the second preferred embodiment of the present invention.

Since the nodes and the views are defined as mentioned above, for example, if the view v3 is selected, a GUI screen 200 shown in FIG. 17 is displayed on the display apparatus 10.

As shown in FIG. 17, an MD recording button 201 corresponding to the node n1, a CD reproduction button 202 corresponding to the node n5, a CD song selection button 203 corresponding to the node n6, and an STB channel selection button 204 corresponding to the node n8 are displayed on the GUI screen 200.

As mentioned above, according to the communication system 101 of the preferred embodiment of the present invention, the menu screens of a plurality of electronic apparatuses or the like can be easily and collectively managed by using the GUI operation description program 20. Also, according to the communication system 101, the user can easily generate the various GUI screens/displays in which the menu screens of a plurality of devices are mixed.

Finally, the configurations and structures of respective units and portions described specifically with respect to the preferred embodiments of the present invention are only examples of realization of the present invention, so the embodiments thereof should not be construed as to limiting the technical scope of the present invention. Accordingly, any variations, combinations and sub-combinations of the present preferred embodiments should be permitted without departing from the technical scope of the invention.

What is claimed is:

1. A display controlling method for controlling a display of an image on a display screen corresponding to a plurality of nodes specified by a view, said method comprising the steps of:

selecting said view based on a program, said program including:

said node including a constitutive element of said image and indicating a link to data to be accessed and/or a fixed attribute of said data to be accessed, and said view for specifying said plurality of nodes and a tree structure for displaying said image and said data associated with said plurality of nodes on said display screen;

displaying said image corresponding to said data associated with said plurality of nodes in response to a selection of said view, said image being displayed according to said tree structure specified by said view; and generating an other view specifying another plurality of nodes based on a frequency of selection by a user of said plurality of nodes, wherein each of said plurality of nodes corresponds to an operational function of an electronic apparatus in a home network environment.

2. The display controlling method according to claim 1, further comprising the step of determining a subsequent view to be selected according to an operation performed on said display screen.

3. The display controlling method according to claim 1, wherein said other view is generated in accordance with an operation history.

4. The display controlling method according to claim 3, further comprising the step of selecting and displaying said other view.

5. The display controlling method according to claim 1, further comprising the steps of:
   generating said tree structure for establishing a hierarchical relation between said plurality of nodes and a plurality of views; and
   determining said selected view, a process for displaying said image, and said other view based on said generated tree structure.

6. The display controlling method according to claim 5, wherein said program further includes a data group indicating inter-relationships between said plurality of nodes.

7. The display controlling method according to claim 5, wherein said program further includes a data group indicating a mode of transition of said plurality of views.

8. A display controlling apparatus comprising:
   a storage unit for storing data in a structure form including:
      a node being a structural element of a pictorial representation of data to be accessed and comprising a link to said data to be accessed, and
      a view formed of a plurality of nodes and specifying a tree structure for displaying said data associated with said plurality of nodes on a display screen;
   a data analyzer for analyzing said structure form stored in said storage unit and for generating said tree structure for establishing a hierarchical structure between said plurality of nodes and said view;
   a selecting mechanism for selecting said view based on said tree structure and an operation performed on said screen;
   a display control unit for controlling a display of said display screen in order to display said data associated with said plurality of nodes selected via said selecting mechanism in accordance to said tree structure for displaying said data associated with said plurality of nodes on said display screen as defined by said view and; and
   a view generating mechanism for generating an other view specifying another plurality of nodes based on a frequency of selection by a user of said plurality of nodes, wherein each of said plurality of nodes corresponds to an operational function of an electronic apparatus in a home network environment.

* * * * *